United States Patent

Garnaat et al.

[11] Patent Number: 5,546,085
[45] Date of Patent: Aug. 13, 1996

[54] SEPARATING COHERENT RADIO-FREQUENCY INTERFERENCE FROM SYNTHETIC APERTURE DATA

[75] Inventors: John A. Garnaat, Phoenix; Bruce H. Ferrell, Litchfield Park; William C. Woody, Phoenix, all of Ariz.

[73] Assignee: Loral Corporation, New York, N.Y.

[21] Appl. No.: 349,449

[22] Filed: Dec. 5, 1994

[51] Int. Cl.⁶ .................................................. G01S 13/90
[52] U.S. Cl. ............................................. 342/25; 342/196
[58] Field of Search ............................. 342/25, 159, 160, 342/162, 194, 195, 196, 197

[56] References Cited

U.S. PATENT DOCUMENTS

| | | | |
|---|---|---|---|
| 4,034,370 | 7/1977 | Mims | 342/25 |
| 4,999,635 | 3/1991 | Niho | 342/25 |
| 5,043,734 | 8/1991 | Niho | 342/25 |
| 5,179,383 | 1/1993 | Raney et al. | 342/25 |
| 5,200,754 | 4/1993 | Niho | 342/25 |
| 5,245,347 | 9/1993 | Bonta et al. | 32/149 |
| 5,248,976 | 9/1993 | Niho et al. | 342/25 |
| 5,343,204 | 8/1994 | Farmer et al. | 342/25 |
| 5,430,445 | 7/1995 | Peregrim et al. | 342/25 |
| 5,448,241 | 9/1995 | Zeoli et al. | 342/25 |
| 5,469,167 | 11/1995 | Polge et al. | 342/25 |
| 5,488,373 | 1/1996 | Hellsten | 342/25 |
| 5,489,907 | 2/1996 | Zink et al. | 342/25 |
| 5,495,248 | 2/1996 | Kawase et al. | 342/25 |

*Primary Examiner*—John B. Sotomayor
*Attorney, Agent, or Firm*—Perman & Green

[57] ABSTRACT

The data is processed using a quadratic phase removal process to remove quadratic phase variations contained in the interference to compress the interference to its narrowest extent in a range frequency dimension. Partial motion compensation may be optionally employed using the partial motion compensation process to remove incidental Doppler modulation of the interference caused by motion of the radar during data collection, and to center the Doppler spectrum of radar and interference signals at a convenient frequency. The data is processed using an azimuth Fourier transform to compress the interference to its narrowest extent in an azimuth dimension to localize the interference into peaks while leaving the desired radar signals dispersed throughout the data in one or both dimensions. Optionally, another set of interference data, collected and interleaved with the radar video data and delayed a short time with respect to it, may be compressed in range frequency using a similar quadratic phase removal process and partially motion compensated to remove effects of undesired aircraft motion using a partial motion compensation process and compressed in azimuth using an azimuth FFT. The 2-D compressed interference data is then subtracted from the 2-D compressed radar video data by a subtraction process. The data is processed using a thresholding process to find interference peaks in the data. The found peaks are attenuated by attenuating azimuth cells and range cells. The data is processed using a second azimuth Fourier transform to restore the data to its original format. The data is then processed to produce an image for display. This is achieved by processing the data using a final motion compensation process to provide reference point tracking to remove the phase change imparted by the intentional motion of the aircraft during data collection, polar resampling the motion compensated data, weighting and two-dimensional Fourier transforming the polar resampled data, and autofocusing 25 the data to produce the image for display.

9 Claims, 1 Drawing Sheet

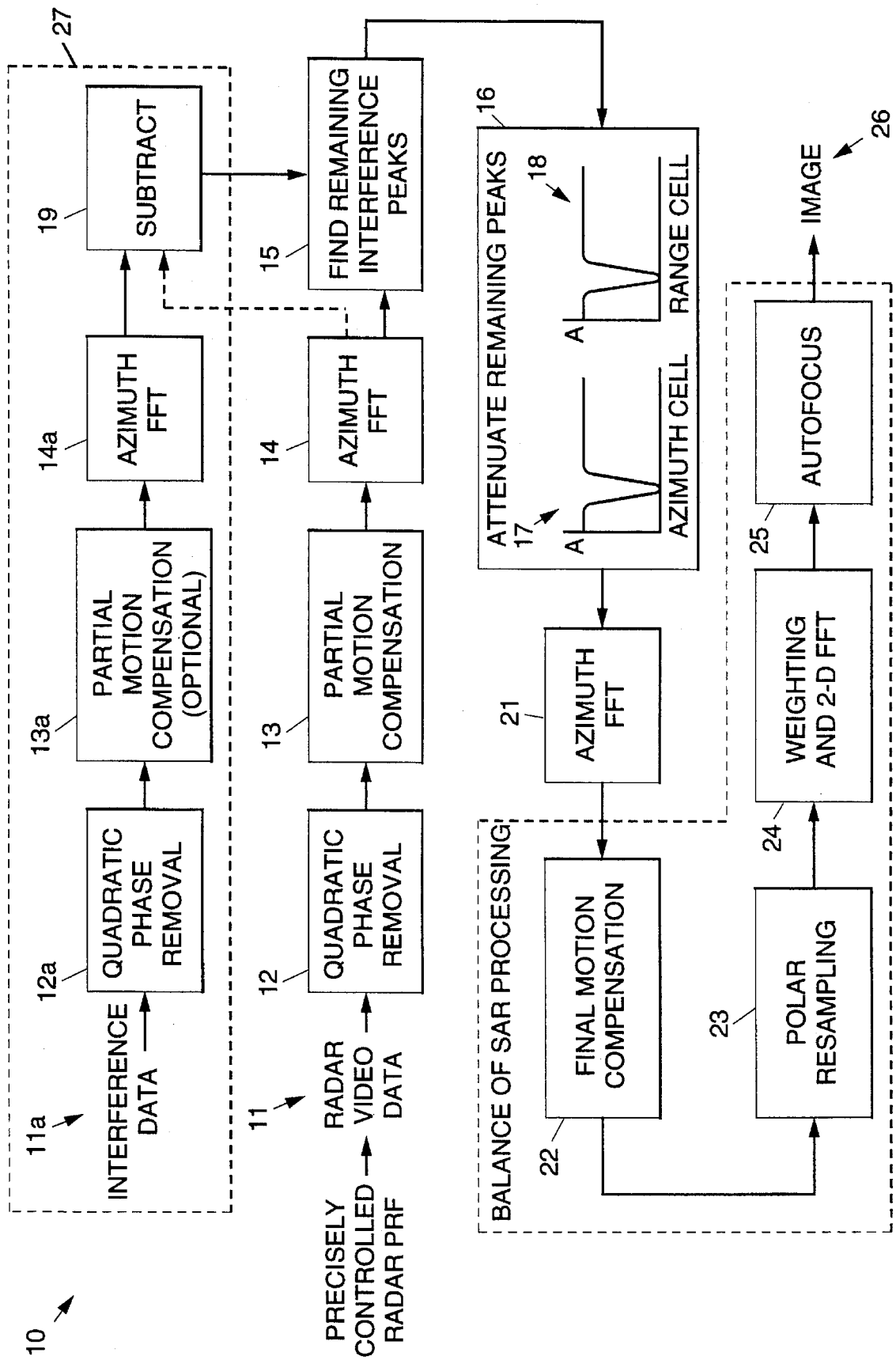

SEPARATING COHERENT RADIO-FREQUENCY INTERFERENCE FROM SYNTHETIC APERTURE DATA

The present invention was developed with the support of the U.S. Government under Contract No. DAAH01-94-C-R014. The U.S. Government has certain rights in this invention.

BACKGROUND

The present invention relates to synthetic aperture radar data processing, and more particularly, to the use of interference compression to substantially remove interference from synthetic aperture radar data while minimally disturbing the desired radar data.

Synthetic aperture radars collect coherent echoes from objects primarily located on the surface of the earth. Images of these features are made using a variety of signal processing techniques. Coherent interference is present in the images generated by the terrain-imaging synthetic aperture radars. Such interference severely degrades the appearance and information content of radar imagery. Also, coherent interference occurs in carrier signals of television broadcasting stations, mobile and portable two-way radios, cellular telephone systems, and the like. Such interference also degrades the performance of these systems.

Prior to the development of the present invention, some experiments relating to radio frequency interference (RFI) removal were performed during a Government contract (Contract No. F33615-90-C-1417). These preliminary experiments did not involve any processing of the data in such a way as to compress or localize the interference and thereby facilitate its removal, nor was subtraction of interference performed.

Conventional interference removal techniques for processing synthetic aperture radar data have involved removal of long lines or large blocks of data corrupted by interference. Such techniques do not exploit the central concept of the present invention, which are interference compression to remove interference without disturbing the desired radar data, and interference removal by means of subtraction.

Prior art techniques for providing interference removal did not preferentially compress the radio frequency interference. Therefore, when interference removal was attempted, substantial amounts of radar data were lost because it was summed with interference and was indistinguishable from it. Furthermore, the conventional techniques were manual and were therefore slow and dependent upon operator skill or experimentation.

In view of the above, it is an objective of the present invention to provide for an improved method for processing synthetic aperture radar data by compressing radio frequency interference to substantially remove interference from the synthetic aperture radar data without disturbing the desired radar data.

SUMMARY OF THE INVENTION

In order to meet the above and other objectives, the present invention is a method for processing synthetic aperture radar data comprising desired data and radio frequency interference to remove the radio frequency interference therefrom without disturbing the desired radar data. The method comprises the following steps.

The data is processed using a quadratic phase removal process to remove quadratic phase variations contained in the interference to compress the interference to its narrowest extent in the range frequency dimension. The data is processed using an azimuth Fourier transform to compress the interference to its narrowest extent in the azimuth dimension to localize the interference into peaks while leaving the desired radar signals dispersed throughout the data in one or both dimensions. The data is processed using a thresholding process to find interference peaks in the data. The found peaks are attenuated by attenuating azimuth cells and range cells.

Alternatively, data sets collected a short time apart (for example, several hundred microseconds), are independently processed to compress radio frequency interference (RFI). One data set includes desired radar signals plus interference, and the other set includes interference only. This can be achieved by turning off the transmitter on alternate radar pulses. It can also be achieved approximately, in a multiple polarization system, by using same sense receive cross polarization data collected interleaved with copolarization data. The two independently collected and compressed data sets are then subtracted, either coherently or noncoherently. Coherent subtraction uses complex arithmetic. Noncoherent subtraction subtracts magnitudes, and uses the phase associated with the transmit plus receive data, or the copolarization data in a multiple polarization system. Phase compensation may be used to improve performance of coherent subtraction.

Once subtraction is performed, the data is then processed using a second azimuth Fourier transform to restore the dat to its original format. The data is then processed using conventional SAR processing methods to produce an image for display. RFI removal using subtraction and thresholding followed by alternation may be used independently or in combination. The data is processed using a second azimuth Fourier transform to restore the data to its original format. The data is then processed to produce an image for display.

The validity and utility of the present invention has been demonstrated by its implementation in software and the execution of the software in processing actual radar data containing radio frequency interference (RFI) collected by an airborne radar system. Successful compression of radio frequency interference (RFI) has been accomplished. Successful subtraction of compressed RFI using airborne SAR data has also been accomplished. Improved radar images with compressed and removed radio frequency interference (RFI) using the present invention have been obtained.

The present invention enhances the usefulness and image quality of terrainimaging synthetic aperture radars operating in the presence of radio frequency interference (RFI). Such terrain-imaging synthetic aperture radars typically operate in the frequency range from 100–1,000 MHz. However, it is to be understood that the present invention is not confined to this particular frequency range.

The present invention uses conventional signal-processing techniques in an unconventional manner to isolate the coherent radio frequency interference into small regions of the frequency plane, which is the Fourier transform of the spatial domain or image plane. Interference components from a large two-dimensional array of radar data are compressed into narrow peaks that are readily distinguishable from desired radar signals. This permits removal of the coherent radio-frequency interference with very little effect on the desired radar signals.

The present invention provides for compression of the coherent radio-frequency interference in the Fourier transform of the radar range dimension, if the interference has been dispersed by any prior radar or signal-processing operation, followed by compression in the Doppler dimension. In an ideal case, the coherent interference then occupies the smallest possible area in the data plane, and can therefore be excised or subtracted with the least adverse effect on desired radar data.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which the sole drawing figure illustrates a method for processing synthetic aperture radar data in accordance with the principles of the present invention by compressing radio frequency interference to substantially remove interference from the synthetic aperture radar data without disturbing the desired radar data.

DETAILED DESCRIPTION

Referring to the drawing figure, a representative implementation of the present invention, but not the only implementation, is shown. More particularly, the drawing figure illustrates a method 10 for processing synthetic aperture radar data 11 comprising desired data and radio frequency interference by compressing radio frequency interference to substantially remove it from the synthetic aperture radar data 11 without disturbing desired radar data.

The method 10 is implemented in accordance with the following processing steps. The synthetic aperture radar data 11 is processed by a quadratic phase removal process 12. The quadratic phase removal process 12 provides for removal of quadratic phase variation contained in the interference to compress the interference to its narrowest extent in the range frequency dimension. After the synthetic aperture radar data 11 is processed by the quadratic phase removal process 12, it is processed by a partial motion compensation process 13. The partial motion compensation process 13 removes incidental Doppler modulation of the interference caused by undesired motion of the radar during data collection, and centers the Doppler spectrum of radar and interference signals at a convenient frequency.

An azimuth Fourier transform (FFT) 14 is then performed on the partially motion compensated synthetic aperture radar data 11. The azimuth Fourier transform (FFT) 14 compresses the interference to its narrowest extent in the azimuth or cross-range dimension. The interference is localized into peaks or "mountains" while the desired radar signals are dispersed throughout the data 11 in one or both dimensions. The Fourier transformed motion compensated synthetic aperture radar data 11 is then processed by a thresholding process 15, such as a constant false alarm rate (CFAR) process, for example. The thresholding process 15 finds interference peaks in the synthetic aperture radar data 11 so that they can be filtered out of the data 11.

The found peaks are then attenuated by an attenuation process 16, wherein azimuth cells 17 and range cells 18 are attenuated. A second azimuth Fourier transform 21 is then performed on the synthetic aperture radar data 11 restores the data 11 to its original format. The Fourier transformed data is then processed by a final motion compensation process 22. The final motion compensation process 22 processes the data 11 to provide for reference point tracking or another means of removing the phase change imparted by the intentional motion of the aircraft.

A polar to rectangular resampling process 23 is then performed in the motion compensated synthetic aperture radar data 11. The polar resampled synthetic aperture radar data 11 is then weighted and a two-dimensional Fourier transform 24 is performed thereon. Finally an autofocus process 25 is performed on the two-dimensional Fourier transformed synthetic aperture radar data 11 to produce an image 26 for display. The polar to rectangular resampling process 23 produces improved images when long synthetic apertures are used, especially at low radar frequencies (long wavelengths). The polar to rectangular resampling process 23 is independent of the processing that removes the radio frequency interference (RFI).

In operation, the synthetic aperture radar data 11 comprising radar video data, including unwanted radio frequency interference, are available either in real time or read out of a storage medium such as an optical or hard disk. Radar reception and demodulation processes (performed prior to the processing shown in the drawing figure) impart a quadratic phase variation to the interference, this variation is removed by the quadratic phase removal process 12 to compress the interference to its narrowest extent in the range frequency dimension. Partial motion compensation may be optionally employed using the partial motion compensation process 13 to remove incidental Doppler modulation of the interference caused by motion of the radar during data collection, and to center the Doppler spectrum of radar and interference signals at a convenient frequency. Fourier transforming the data 11 in an azimuth or cross-range direction using the azimuth Fourier transform process 14 compresses the interference to its narrowest extent in the azimuth or cross-range dimension. Thus, the interference is localized into peaks or "mountains" while the desired radar signals are dispersed throughout the data 11 in one or both dimensions.

Optionally, another set of interference data 11a, collected and interleaved with the radar video data and delayed a short time with respect to it, may be compressed in range frequency using a quadratic phase removal process 12a (similar to the process 12) and partially motion compensated to remove effects of undesired aircraft motion using a partial motion compensation process 13a and compressed in azimuth using an azimuth FFT 14a. The 2-D compressed interference data is then subtracted from the 2-D compressed radar video data 11 by a subtraction process 19. The output from the subtraction process 19 is input to the attenuation process 16.

The thresholding process 15, commonly known as constant false alarm rate (CFAR) processing, is an automatic process for finding interference peaks so that they can be filtered out of the data 11 by an attenuation process 16. It is to be understood that processes for finding and removing the interference peaks other than the CFAR process followed by the attenuation process may be employed in the present invention. The second azimuth Fourier transform (FFT) process 21 restores the data 11 to its original format. Subsequent processing operations (final motion compensation 22, polar resampling 23, weighting and two-dimensional Fourier transform 24 and autofocus processing 25) complete normal signal processing needed to convert the data 11 into the desired image 26 for display.

The system PRF may be deliberately controlled to make it a submultiple of the television broadcast signal horizontal scan rate. A PRF is generated by counting down from a precise stable local oscillator (STALO), which is the basic timing circuit of the radar system. This results in a precise, low-jitter PRF that is derived from the same STALO as the radar transmit waveform. Thus, any PRF that is an integer dividend of the 25 MHz digital waveform generator clock can be generated merely by changing the contents of the firmware.

It has been discovered and has been demonstrated that RFI compresses better when the PRF is a submultiple of the TV horizontal scan rate. Furthermore certain submultiples are more favorable. The best compression has been achieved to date with a PRF=Fhscan/9, or about 1748.25 MHz. Recent experiments with RFI subtraction after compression indicate that good compression provided by the tailored PRF aids in the subtraction process. A much larger fraction of the RFI energy can be subtracted using such a tailored PRF compared with a conventional PRF. PRFs of 2*Fhscan/9 (3496.50 Hz or 4*Fhscan/9 (6993.00 Hz) will permit collection of radar data interleaved with receive-only data for RFI subtraction, with an effective PRF of Fhscan/9.

Thus there has been described a new and improved method for processing synthetic aperture radar data that compresses radio frequency interference to substantially remove it from the synthetic aperture radar data without disturbing the desired radar data. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A method of processing synthetic aperture radar data comprising desired data and radio frequency interference derived from a synthetic aperture radar to remove the radio frequency interference therefrom without disturbing the desired data, said method comprising the steps of:

processing the radar data using a quadratic phase removal process to remove quadratic phase variations contained in the interference to compress the interference to its narrowest extent in a range frequency dimension;

processing the radar data using an azimuth Fourier transform to compress the interference to its narrowest extent in an azimuth dimension to localize the interference into peaks while leaving the desired data dispersed throughout the radar data in one or both dimensions;

processing the radar data using a thresholding process to find interference peaks in the radar data;

attenuating the found peaks so as to attenuate azimuth cells and range cells;

processing the radar data using a second azimuth Fourier transform to restore the radar data to its original format; and processing the radar data to produce an image for display.

2. The method of claim which further comprises the step of:

processing the radar data using a partial motion compensation process to remove incidental Doppler modulation of the interference caused by undesired motion of the radar during data collection, and center the Doppler spectrum of radar and interference signals at a convenient frequency.

3. The method of claim 1 wherein the step of processing the radar data using a thresholding process, comprises processing the radar data using a constant false alarm rate process.

4. The method of claim 1 wherein the step of processing the motion compensated radar data to produce the image for display comprises the steps of:

processing the radar data using a final motion compensation process to provide reference point tracking to remove the phase change imparted by the intentional motion of the aircraft during data collection;

polar resampling the motion compensated radar data;

weighting and two-dimensional Fourier transforming the polar resampled data;

autofocusing the radar data to produce the image for display.

5. The method of claim 1 which further comprises processing interference data that is collected and interleaved with the desired data and delayed a short time with respect thereto comprises the steps of:

processing the interference data using a quadratic phase removal process to remove quadratic phase variations contained in the interference to compress the interference to its narrowest extent in a range frequency dimension;

processing the interference data using an azimuth Fourier transform to compress the interference to its narrowest extent in an azimuth dimension to localize the interference into peaks while leaving the desired data dispersed throughout the radar data in one or both dimensions; and subtracting the interference data from the compressed interference data prior to processing the data using the thresholding process to find the interference peaks.

6. A method of processing synthetic aperture radar data comprising desired data and radio frequency interference derived from a synthetic aperture radar disposed on an aircraft to remove the radio frequency interference therefrom without disturbing the desired data, said method comprising the steps of:

processing the radar data using a quadratic phase removal process to remove quadratic phase variations contained in the interference to compress the interference to its narrowest extent in a range frequency dimension;

processing the radar data using a partial motion compensation process to remove incidental Doppler modulation of the interference caused by motion of the radar during data collection, and center the Doppler spectrum of the radar data and interference signals at a convenient frequency;

processing the radar data using an azimuth Fourier transform to compress the interference to its narrowest extent in an azimuth dimension to localize the interference into peaks while leaving the desired data dispersed throughout the radar data in one or both dimensions;

processing the radar data using a thresholding process to find interference peaks in the radar data;

attenuating the found peaks so as to attenuate azimuth cells and range cells;

processing the radar data using a second azimuth Fourier transform to restore the radar data to its original format;

processing the radar data using a final motion compensation process to reference point tracking to remove the phase change imparted by the intentional motion of the aircraft during data collection; and processing the motion compensated data to produce an image for display.

7. The method of claim 6 wherein the step of processing the radar data using a thresholding process, comprises processing the data using a constant false alarm rate process.

8. The method of claim 6 wherein the step of processing the motion compensated data to produce the image for display comprises the steps of:

processing the radar data using a final motion compensation process to provide reference point tracking to remove the phase change imparted by the intentional motion of the aircraft during data collection;

polar resampling the motion compensated data;

weighting and two-dimensional Fourier transforming the polar resampled data;

autofocusing the polar resampled data to produce the image for display.

9. The method of claim 6 which further comprises processing interference data that is collected and interleaved with the desired data and delayed a short time with respect thereto comprises the steps of:

processing the interference data using a quadratic phase removal process to remove quadratic phase variations contained in the interference to compress the interference to its narrowest extent in a range frequency dimension;

processing the interference data using an azimuth Fourier transform to compress the interference to its narrowest extent in an azimuth dimension to localize the interference into peaks while leaving the desired data dispersed throughout the radar data in one or both dimensions; and subtracting the interference data from the compressed interference data is from the compressed radar data prior to processing the data using the thresholding process to find the interference peaks.

* * * * *

UNITED STATES PATENT AND TRADEMARK OFFICE
CERTIFICATE OF CORRECTION

PATENT NO. : 5,546,085
DATED : Aug. 13, 1996
INVENTOR(S) : Garnaat et al.

It is certified that error appears in the above-identified patent and that said Letters Patent is hereby corrected as shown below:

Column 5, line 55, should read
--2. The method of claim 1 which further comprises the step of--.

Signed and Sealed this

Twenty-fourth Day of December, 1996

Attest:

BRUCE LEHMAN

*Attesting Officer*  *Commissioner of Patents and Trademarks*